(12) United States Patent
Lee et al.

(10) Patent No.: US 11,682,527 B2
(45) Date of Patent: Jun. 20, 2023

(54) MULTILAYER CAPACITOR

(71) Applicant: SAMSUNG ELECTRO-MECHANICS CO., LTD., Suwon-si (KR)

(72) Inventors: Jang Yeol Lee, Suwon-si (KR); Hye Min Bang, Suwon-si (KR); Tae Joon Park, Suwon-si (KR); Hai Joon Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 17/307,388

(22) Filed: May 4, 2021

(65) Prior Publication Data

US 2022/0172898 A1 Jun. 2, 2022

(30) Foreign Application Priority Data

Nov. 27, 2020 (KR) ........................ 10-2020-0162565

(51) Int. Cl.
*H01G 4/30* (2006.01)
*H01G 4/008* (2006.01)
*H01G 4/012* (2006.01)
*H01G 4/248* (2006.01)

(52) U.S. Cl.
CPC .............. *H01G 4/30* (2013.01); *H01G 4/008* (2013.01); *H01G 4/012* (2013.01); *H01G 4/248* (2013.01)

(58) Field of Classification Search
None
See application file for complete search history.

(56) References Cited

U.S. PATENT DOCUMENTS

| 9,959,973 | B2 * | 5/2018 | Saito ........................ H01G 4/30 |
| 10,366,834 | B1 * | 7/2019 | Lee ........................ H01G 4/248 |
| 11,302,480 | B2 * | 4/2022 | Takahashi ............ H01G 4/2325 |
| 2009/0191418 | A1 | 7/2009 | Nakano et al. |
| 2013/0299215 | A1 * | 11/2013 | Taseda ................. H01G 4/2325 174/255 |
| 2016/0086733 | A1 * | 3/2016 | Saito .................... H01G 4/1227 205/183 |
| 2019/0341190 | A1 | 11/2019 | Lee et al. |

(Continued)

FOREIGN PATENT DOCUMENTS

| KR | 10-1055161 B1 | 8/2011 |
| KR | 10-2076153 B1 | 2/2020 |

*Primary Examiner* — Dion R. Ferguson
(74) *Attorney, Agent, or Firm* — Morgan, Lewis & Bockius LLP (57) ABSTRACT

A multilayer capacitor includes a body including a stack structure in which a plurality of dielectric layers are stacked and a plurality of internal electrodes are stacked with the dielectric layers interposed therebetween, external electrodes formed on an external surface of the body to be connected to the internal electrodes, and including a first electrode layer covering a first surface of the body to which the internal electrodes are exposed, and a second electrode layer covering the first electrode layer, a first metal oxide layer disposed between the first and second electrode layers and having a discontinuous region, and a second metal oxide layer covering at least a portion of a surface of the body on which the external electrodes are not disposed and having a multilayer structure.

19 Claims, 7 Drawing Sheets

(56) References Cited

U.S. PATENT DOCUMENTS

| | | | |
|---|---|---|---|
| 2019/0355520 A1* | 11/2019 | Nakamura | H01G 4/30 |
| 2021/0005384 A1* | 1/2021 | Lee | H01G 4/2325 |
| 2021/0012964 A1* | 1/2021 | Lee | H01G 4/232 |
| 2021/0012965 A1* | 1/2021 | Lee | H01G 4/30 |
| 2022/0013291 A1* | 1/2022 | Nishisaka | H01G 4/008 |
| 2022/0139616 A1* | 5/2022 | Kang | H01G 4/248 361/301.4 |

* cited by examiner

MULTILAYER CAPACITOR

CROSS-REFERENCE TO RELATED APPLICATION(S)

This application claims benefit of priority to Korean Patent Application No. 10-2020-0162565 filed on Nov. 27, 2020 in the Korean Intellectual Property Office, the disclosure of which is incorporated herein by reference in its entirety.

BACKGROUND

1. Field

The present disclosure relates to a multilayer capacitor.

2. Description of Related Art

A capacitor is an element capable of storing electricity, and generally uses a principle in which electricity is accumulated in each electrode when a voltage is applied by opposing two electrodes. When a direct current (DC) voltage is applied to the capacitor, a current flows in the capacitor while the electricity is accumulated, but when the accumulation of the electricity is completed, the current does not flow in the capacitor. Meanwhile, when an alternating current (AC) voltage is applied to the capacitor, an alternating current flows in the capacitor while polarities of the electrodes are alternated.

Such a capacitor may be classified as one of several kinds of capacitors such as an aluminum electrolytic capacitor in which electrodes are formed of aluminum and a thin oxide layer is disposed between the electrodes formed of aluminum, a tantalum capacitor in which tantalum is used as an electrode material, a ceramic capacitor in which a dielectric material having a high dielectric constant such as a barium titanate is used between electrodes, a multilayer ceramic capacitor (MLCC) in which a ceramic having a high dielectric constant is used in a multilayer structure as a dielectric material provided between electrodes, a film capacitor in which a polystyrene film is used as a dielectric material provided between electrodes, and the like, depending on a kind of insulator provided between electrodes.

Thereamong, the multilayer ceramic capacitor has been recently used mainly in various fields such as a high frequency circuit, and the like, since it has excellent temperature characteristics and frequency characteristics and may be implemented at a small size. In recent years, attempts to implement a smaller multilayer ceramic capacitor continue, and to this end, dielectric layers and internal electrodes are formed thinly.

In recent years, in the field of multilayer capacitor, many attempts have been made to improve moisture resistance reliability by reducing defects caused by penetration of moisture or plating solutions. As one method, when a cover layer of a capacitor body or an external electrode is formed to be thick, there may be a problem that a size of a component increases and a capacitance decreases at the same size.

SUMMARY

An aspect of the present disclosure may provide a multilayer capacitor having improved moisture resistance reliability.

According to an aspect of the present disclosure, a multilayer capacitor may include a body having a stack structure in which a plurality of dielectric layers are stacked and a plurality of internal electrodes are stacked with the dielectric layers interposed therebetween; external electrodes formed on an external surface of the body to be connected to the internal electrodes, and including a first electrode layer covering a first surface of the body to which the internal electrodes are exposed, and a second electrode layer covering the first electrode layer; a first metal oxide layer disposed between the first and second electrode layers and having a discontinuous region; and a second metal oxide layer covering at least a portion of a surface of the body on which the external electrodes are not disposed and having a multilayer structure.

The first and second metal oxide layers may be in contact with each other.

A boundary between the first and second metal oxide layers may be located at an end portion of the second electrode layer.

The first and second metal oxide layers may include the same metal oxide component.

The second metal oxide layer may cover a second surface of the body, perpendicular to a stacking direction of the plurality of internal electrodes and a third surface of the body, perpendicular to the first and second surfaces of the body.

The second metal oxide layer may cover the entirety of the second surface and the third surface of the body.

At least a portion of the discontinuous region of the first metal oxide layer may be filled with at least one of the first and second electrode layers.

The first and second electrode layers may include the same material.

The first and second electrode layers may include at least one of copper (Cu) or nickel (Ni).

The first and second electrode layers may include a metal oxide formed of the same component as that included in the first metal oxide layer.

The first metal oxide layer may further include a glass component.

The multilayer structure of the second metal oxide layer may include a stack structure of a first layer and a second layer of different components.

The first layer and the second layer may be repeatedly stacked alternately at least two times.

The first layer may be divided into a plurality of regions by a first gap formed between the divided regions, and the second layer may be divided into a plurality of regions by a second gap formed between the divided regions.

The first gap and the second gap may be disposed so as not to overlap in a thickness direction of the first layer and the second layer in at least some regions of the stack structure.

The first metal oxide layer may have a multilayer structure.

A surface of the first metal oxide layer may have a random shape.

A groove may be formed on the surface of the body, and the second metal oxide layer may fill the groove.

The external electrodes may further include an additional electrode layer covering the second electrode layer, and an end portion of the additional electrode layer may cover the second metal oxide layer.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Hereinafter, exemplary embodiments in the present disclosure will be described in detail with reference to the accompanying drawings. However, the exemplary embodiments in the present disclosure may be modified in many different forms and the scope of the present disclosure is not limited to the exemplary embodiments described below. In addition, the exemplary embodiments in the present disclosure are provided in order to more completely explain the present disclosure to a person skilled in the art. Therefore, the shapes and sizes of elements in the drawings may be exaggerated for clearer description, and elements indicated by the same reference numerals in the drawings are the same elements.

In addition, in the drawings, portions unrelated to the description will be omitted in order to clearly describe the present disclosure, thicknesses of several layers and regions are exaggerated for clarity, and components having the same functions within the scope of the same idea will be denoted by the same reference numerals. Further, throughout the specification, when a certain portion "includes" a certain component, it means that other components may be further included rather than excluding other components unless otherwise stated.

Figure 1:
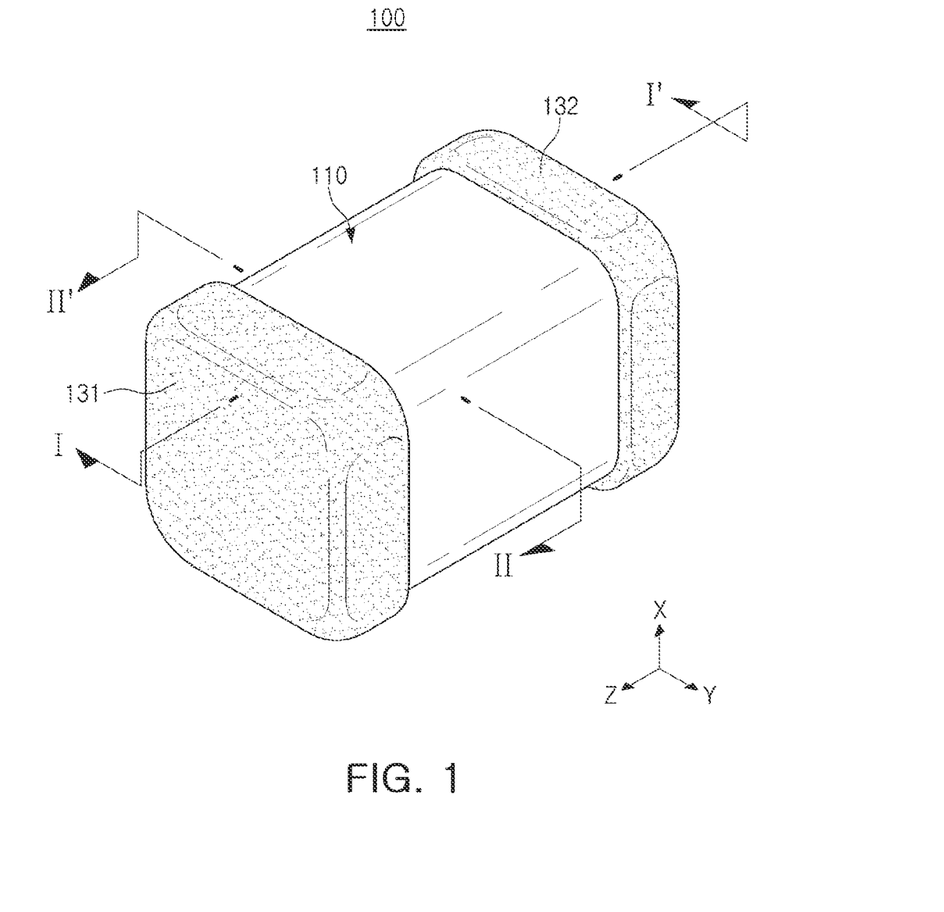
FIG. 1 is a schematic perspective view illustrating an appearance of a multilayer capacitor according to an exemplary embodiment in the present disclosure.
Figure 2:
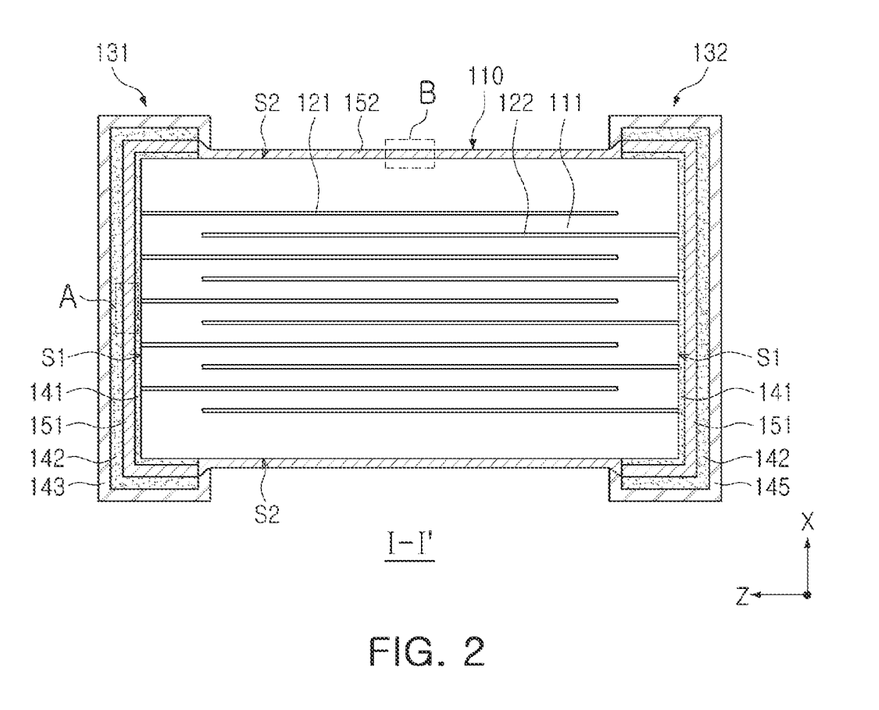
FIG. 2 is a cross-sectional view taken along line I-I' of the multilayer capacitor of FIG. 1.
Figure 3:
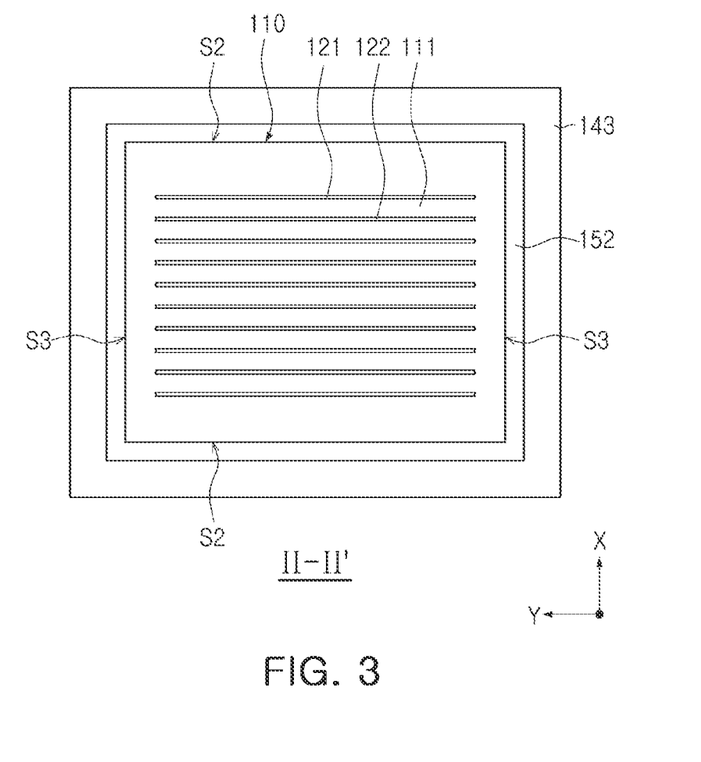
FIG. 3 is a cross-sectional view taken along line II-II' of the multilayer capacitor of FIG. 1.

FIG. 1 is a schematic perspective view illustrating an appearance of a multilayer capacitor according to an exemplary embodiment in the present disclosure. FIGS. 2 and 3 are cross-sectional views taken along lines I-I' and II-II' of the multilayer capacitor of FIG. 1, respectively. In addition, FIGS. 4 through 9 are enlarged views of a partial region of FIG. 2.

Referring to FIGS. 1 through 4, a multilayer capacitor 100 according to an exemplary embodiment in the present disclosure may include a body 110 including dielectric layers 111 and a plurality of internal electrodes 121 and 122 stacked with each of the dielectric layers 111 interposed therebetween, external electrodes 131 and 132, and first and second metal oxide layers 151 and 152. Here, the first and second metal oxide layers 151 and 152 may prevent intrusion of moisture or plating solution from the outside. The first metal oxide layer 151 may have a discontinuous region D, and the second metal oxide layer 152 may have a multilayer structure.

The body 110 may include a plurality of dielectric layers 111, and may be obtained by stacking and then sintering, for example, a plurality of green sheets. The plurality of dielectric layers 111 may have a form in which they are integrated with one another by such a sintering process. In addition, as illustrated in FIG. 1, the body 110 may have a rectangular parallelepiped shape. The dielectric layer 111 included in the body 110 may include a ceramic material having a high dielectric constant, for example, a BT-based ceramic material, that is, barium titanate ($BaTiO_3$)-based ceramic material, but may include other materials known in the related art as long as a sufficient capacitance may be obtained. The dielectric layer 111 may further include additives, organic solvents, plasticizers, binders, dispersants, and the like, if necessary, together with the ceramic material, which is a main component. Here, the additives may be added in a metal oxide form in a manufacturing process. Examples of such a metal oxide additive may include at least one of $MnO_2$, $Dy_2O_3$, $BaO$, $MgO$, $Al_2O_3$, $SiO_2$, $Cr_2O_3$, or $CaCO_3$.

Each of the plurality of internal electrodes 121 and 122 may be obtained by printing and then sintering a paste including a conductive metal at a predetermined thickness on one surface of the ceramic green sheet. In this case, the plurality of internal electrodes may include first and second internal electrodes 121 and 122 exposed in directions of the body 110 opposing each other (Z direction based on the drawing), and a surface of the body 110 to which the first and second internal electrodes 121 and 122 are exposed will be defined as a first surface S1. The first and second internal electrodes 121 and 122 may be connected to different external electrodes 131 and 132, respectively, to have different polarities when the multilayer capacitor is driven, and may be electrically separated from each other by each of the dielectric layers 111 disposed therebetween. However, according to another exemplary embodiment, the number of external electrodes 131 and 132 or a connection manner of the internal electrodes 121 and 122 may be changed. An example of a main material constituting the internal electrodes 121 and 122 may include copper (Cu), nickel (Ni), silver (Ag), palladium (Pd), or the like, or alloys thereof.

The external electrodes 131 and 132 may include first and second external electrodes 131 and 132 formed on external surfaces of the body 110 and electrically connected to the first and second internal electrodes 121 and 122, respectively. Each of the external electrodes 131 and 132 may include a first electrode layer 141 and a second electrode layer 142, and may further include an additional electrode layer 143.

The first electrode layer 141 may be disposed on the first surface S1 of the body 110. Here, the first surface S1 may correspond to the surface to which the internal electrodes 121 and 122 are exposed. The first electrode layer 141 may be connected to the internal electrodes 121 and 122 and may be formed of a conductive material such as copper (Cu), nickel (Ni), or an alloy thereof. The first electrode layer 141 may be formed by transferring, printing, or dipping a conductive paste on the first surface S1 of the body 110. In this case, the first electrode layer 141 may be formed on all of a second surface S2, perpendicular to a stacking direction (X direction) of the internal electrodes 121 and 122, and a third surface S3, perpendicular to the first and second surfaces S1 and S2, in addition to the first surface S1 of the body 110. However, depending on the exemplary embodiment, the first electrode layer 141 may also be formed only on the first surface S1 of the body 110. The second electrode layer 142 may cover the first electrode layer 141 and may be formed of a conductive material such as nickel (Ni), copper (Cu), or an alloy thereof. In this case, the second electrode layer 142 may include the same material as the first electrode layer 141. The second electrode layer 142 may be formed by transferring, printing, or dipping a conductive paste to cover a first metal oxide layer 151. When the above-described method is used, the first and second electrode layers 141 and 142 may be implemented in the form of sintered electrodes obtained by sintering the conductive paste.

Figure 4:
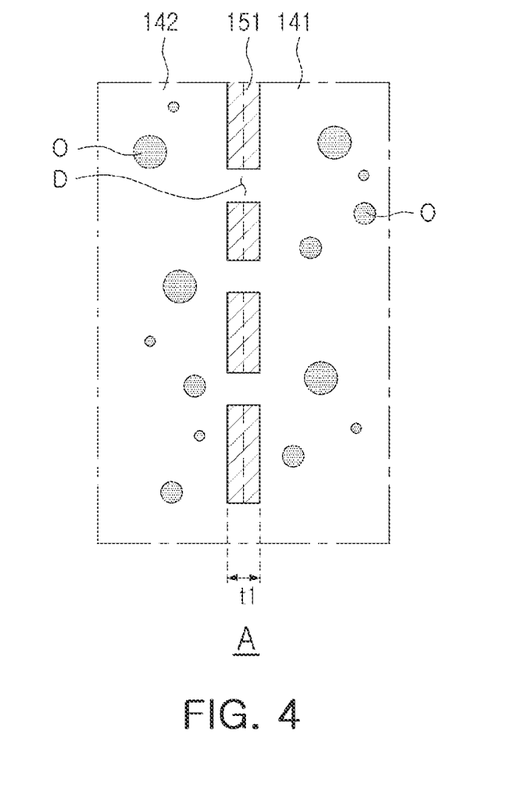
FIG. 4 is an enlarged view of a partial region A of FIG. 2.

The first metal oxide layer 151 may be disposed between the first and second electrode layers 141 and 142 and may have a discontinuous region D as illustrated in FIG. 4. The first metal oxide layer 151 may effectively block a plating solution from penetrating into the body 110 through the electrode layers 141 and 142. To this end, in the present exemplary embodiment, by implementing the first metal oxide layer 151 with a metal oxide that may be coated relatively thinly and uniformly, the size of the external electrodes 131 and 132 may be kept small, while improving moisture resistance blocking characteristics. In consideration of this function, a metal oxide component included in the first metal oxide layer 151 may include, for example, an oxide of silicon (Si), aluminum (Al), zirconium (Zr), lithium (Li), or hafnium (Hf).

Figure 9:
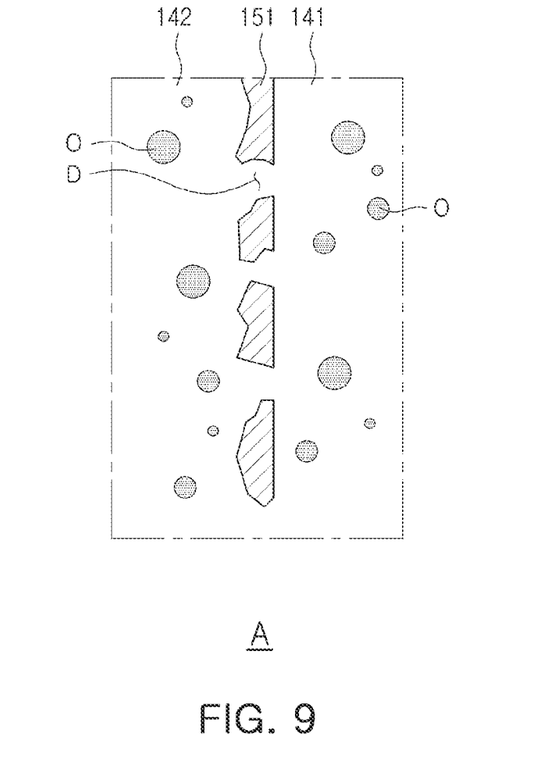
FIG. 9 is an enlarged view of a partial region A of FIG. 2.

The first metal oxide layer 151 may include the discontinuous region D. Here, at least some of the discontinuous region D may be filled with at least one of the first and second electrode layers 141 and 142 so that the first and second electrode layers 141 and 142 may be connected to each other. Electrical connection paths between the first and second electrode layers 141 and 142 may be formed by the discontinuous region D. The discontinuous region D of the first metal oxide layer 151 may be formed as the metal oxide component of the first metal oxide layer 151 is melted and a portion of the first metal oxide layer 151 is separated in a process of sintering the first and second electrode layers 141 and 142. Accordingly, as illustrated in FIG. 9, a surface of the first metal oxide layer 151 may also be formed in a random shape. The first metal oxide layer 151 may be seen to maintain a layer shape as a whole when viewed from a cross section, and a plurality of regions divided by the discontinuous region D may exist in the form of an island. In addition, the first and second electrode layers 141 and 142 may include a metal oxide "O" having the same component as that included in the first metal oxide layer 151. In this case, the metal oxide of the first metal oxide layer 151 or the metal oxide O present in the first and second electrode layers 141 and 142 may be melted together with glass components of the first and second electrode layers 141 and 142 and may react therewith. Accordingly, the first metal oxide layer 151 does not include only the metal oxide, but may also partially include the glass component. In addition, the first metal oxide layer 151 may have a multilayer structure as indicated by a dotted line in FIG. 4. This may be obtained by simultaneously forming the first and second metal oxide layers 151 and 152 in the multilayer structure, as will be described later. However, since a portion of the first metal oxide layer 151 may be lost during the sintering process, the first metal oxide layer 151 does not have a distinct multilayer structure as compared to the second metal oxide layer 152.

Figure 5:
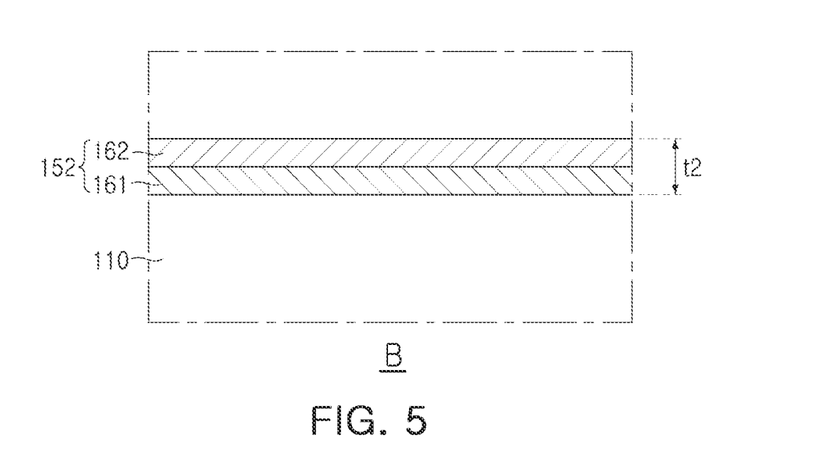
FIG. 5 is an enlarged view of a partial region B of FIG. 2.
Figure 6:
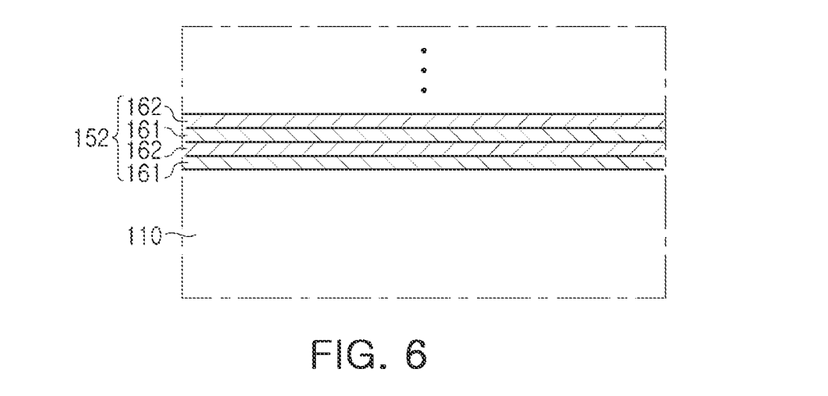
FIG. 6 is an enlarged view of a partial region B of FIG. 2 illustrating another exemplary embodiment of the present disclosure.
Figure 7:
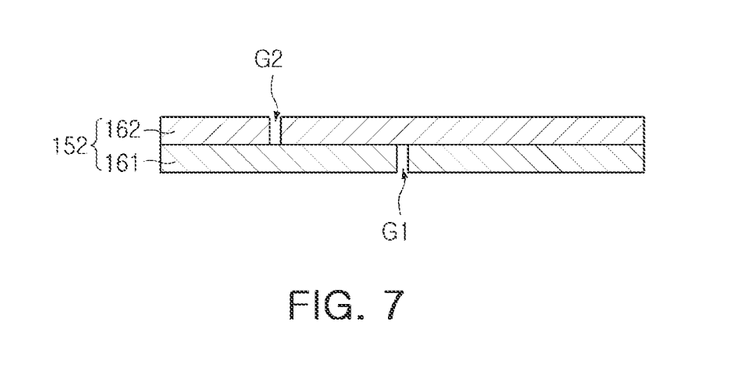
FIG. 7 is an enlarged view of a partial region B of FIG. 2 illustrating another exemplary embodiment of the second metal oxide layer of the present disclosure.

The second metal oxide layer 152 may cover at least a portion of a surface of the body 110 on which the external electrodes 131 and 132 are not disposed. In the present exemplary embodiment, the second metal oxide layer 152 may cover the second surface S2 and the third surface S3 of the body 110. In addition, the second metal oxide layer 152 may cover the entirety of the second surface S2 and the third surface S3. Since the surface of the body 110 is not exposed by such an entire surface cover structure, the body 110 may be effectively blocked from external moisture. In addition, the second metal oxide layer 152 may include a multilayer structure, for example, a stack structure of a first layer 161 and a second layer 162 on each other as illustrated in FIG. 5, from which a moisture resistance blocking performance may be further improved. In this case, the first layer 161 and the second layer 162 may include different components. For example, the first layer 161 may include $Al_2O_3$, and the second layer 162 may include $HfO_2$. In addition, as illustrated in FIG. 6, the first layer 161 and the second layer 162 may be repeatedly stacked alternately two or more times. In addition, as illustrated in FIG. 7, in the second metal oxide layer 152, the first layer 161 may be divided into a plurality of regions by a first gap G1 formed between the divided regions, and similarly, the second layer 162 may be divided into a plurality of regions by a second gap G2 formed between the divided regions. In this case, positions of the first and second gaps G1 and G2 may be adjusted for moisture resistance blocking performance. Specifically, in at least some regions of the stack structure of the second metal oxide layer 152, the first gap G1 and the second gap G2 may be disposed so as not to overlap in a thickness direction (vertical direction based on the drawing) of the first layer 161 and the second layer 162.

As illustrated in FIG. 2, the first and second metal oxide layers 151 and 152 may be in contact with each other. In this case, a boundary between the first and second metal oxide layers 151 and 152 may be located at an end portion of the second electrode layer 142. Such a connection method of the first and second metal oxide layers 151 and 152 may be obtained, for example, by entirely forming a metal oxide film of a multilayer structure on the surfaces of the first electrode layer 141 and the body 110 after the first electrode layer 141 is formed. The first and second metal oxide layers 151 and 152 may include the same metal oxide component. As described in the example above, the second metal oxide layer 152 may also include, for example, an oxide of silicon (Si), aluminum (Al), zirconium (Zr), lithium (Li), or hafnium (Hf). As described above, the second metal oxide layer 152 may be formed together with the first metal oxide layer 151 rather than formed in a final step after forming all of the external electrodes 131 and 132. In this case, an end portion of the additional electrode layers 143 and 145 in the external electrodes 131 and 132 may cover the second metal oxide layer 152.

The second metal oxide layer 152 may be thicker than the first metal oxide layer 151 (t2>t1). This is because a portion of the first metal oxide layer 151 may be partially lost in the process of sintering the external electrodes 131 and 132, as described above. Meanwhile, considering that the first metal oxide layer 151 has the random shape, the thickness of the first metal oxide layer 151 may be defined as a maximum thickness in the corresponding region. The second metal oxide layer 152 may also be defined as a maximum thickness. However, since the second metal oxide layer 152 has a relatively uniform thickness compared to the first metal oxide layer 151, the second metal oxide layer 152 may be defined as an average thickness. A method of measurement of the thickness of the first and second metal oxide layers includes methods, which is appreciated by the one skilled in the art.

Figure 8:
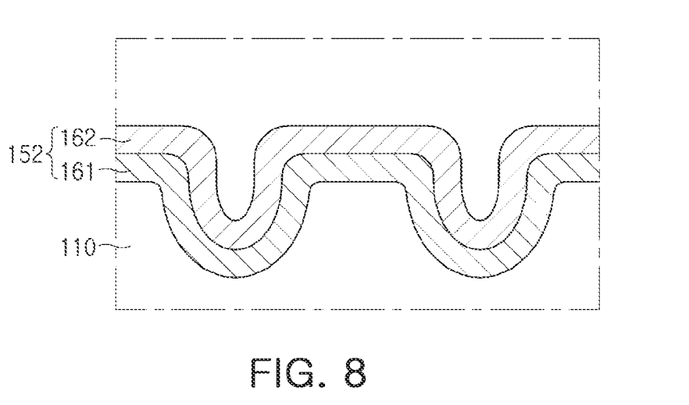
FIG. 8 is an enlarged view of a partial region B of FIG. 2 illustrating another exemplary embodiment of the second metal oxide layer of the present disclosure.

Referring to FIG. 8, the second metal oxide layer 152 may fill a groove formed on the surface of the body 110. In this case, the second metal oxide layer 152 may be formed along a surface of the groove, that is, to follow the surface of the groove. The groove on the surface of the body 110 may be a region where defects of the body 110 exist, and may be a path through which moisture or plating solution easily penetrates. The moisture resistance reliability may be further improved by filling the grooves on the surface of the body 110 with the second metal oxide layer 152 as in the present exemplary embodiment.

Referring to FIG. 2 again, the remaining configurations of the external electrodes 131 and 132 will be described. Each of the external electrodes 131 and 132 may include an additional electrode layers 143 and 145 covering the second electrode layer 142. The additional electrode layers 143 and 145 may be a plating layer, and may be implemented in a multilayer structure including nickel (Ni), tin (Sn), or the like. As described above, when the plating layer is formed, penetration of the plating solution into the body 110 by the first and second metal oxide layers 151 and 152 may be effectively blocked. The additional electrode layer 143 may include a conductive resin electrode in which a conductive material and a resin are mixed in addition to the plating layer. In this case, the conductive resin electrode may be disposed on the plating layer and the second electrode layer 142.

As set forth above, according to the exemplary embodiments in the present disclosure, the moisture resistance reliability of the multilayer capacitor may be improved.

While exemplary embodiments have been shown and described above, it will be apparent to those skilled in the art that modifications and variations could be made without departing from the scope of the present invention as defined by the appended claims.

What is claimed is:

1. A multilayer capacitor comprising:
a body including a stack structure in which a plurality of dielectric layers are stacked and a plurality of internal electrodes are stacked with the dielectric layers interposed therebetween;
external electrodes formed on an external surface of the body to be connected to the internal electrodes, and including a first electrode layer covering a first surface of the body to which the internal electrodes are exposed, and a second electrode layer covering the first electrode layer;
a first metal oxide layer disposed between the first and second electrode layers and having a discontinuous region; and
a second metal oxide layer covering at least a portion of a surface of the body on which the external electrodes are not disposed and having a multilayer structure,
wherein the first metal oxide layer and the second metal oxide layer directly contact to each other at end portions of each of the first metal oxide layer and the second metal oxide layer.

2. The multilayer capacity of claim 1, wherein a boundary between the first and second metal oxide layers is located at an end portion of the second electrode layer.

3. The multilayer capacity of claim 1, wherein the first and second metal oxide layers include the same metal oxide component.

4. The multilayer capacity of claim 1, wherein the second metal oxide layer covers a second surface of the body, perpendicular to a stacking direction of the plurality of internal electrodes and a third surface of the body, perpendicular to the first and second surfaces.

5. The multilayer capacity of claim 4, wherein the second metal oxide layer covers the entirety of the second surface and the third surface of the body on which the external electrodes are not disposed and having a multilayer structure.

6. The multilayer capacity of claim 1, wherein at least a portion of the discontinuous region of the first metal oxide layer is filled with at least one of the first and second electrode layers.

7. The multilayer capacity of claim 1, wherein the first and second electrode layers include the same material.

8. The multilayer capacity of claim 1, wherein the first and second electrode layers include at least one of copper (Cu) or nickel (Ni).

9. The multilayer capacity of claim 1, wherein the first and second electrode layers include a metal oxide, which is also included in the first metal oxide layer.

10. The multilayer capacity of claim 1, wherein the first metal oxide layer further includes a glass component.

11. The multilayer capacity of claim 1, wherein the multilayer structure of the second metal oxide layer includes a first layer disposed on the surface of the body on which the external electrodes are not disposed and having a multilayer structure, and a second layer disposed on the first layer, wherein a component included in the first layer is different from a component included in the second layer.

12. The multilayer capacity of claim 11, wherein the first layer and the second layer are repeatedly stacked alternately at least two times.

13. The multilayer capacity of claim 12, wherein the first layer is divided into a plurality of regions by a first gap formed between the divided regions, and
the second layer is divided into a plurality of regions by a second gap formed between the divided regions.

14. The multilayer capacity of claim 13, wherein the first gap and the second gap are disposed so as not to overlap in a thickness direction of the first layer and the second layer in at least some regions of the stack structure.

15. The multilayer capacity of claim 1, wherein the first metal oxide layer has a multilayer structure.

16. The multilayer capacity of claim 1, wherein a surface of the first metal oxide layer has a random shape.

17. The multilayer capacity of claim 1, wherein the surface of the body includes a groove, and the second metal oxide layer fills the groove.

18. The multilayer capacity of claim 1, wherein the external electrodes further include an additional electrode layer covering the second electrode layer, and an end portion of the additional electrode layer covers the second metal oxide layer.

19. A multilayer capacitor comprising:
a body including a stack structure in which a plurality of dielectric layers are stacked and a plurality of internal electrodes are stacked with the dielectric layers interposed therebetween;
external electrodes formed on an external surface of the body to be connected to the internal electrodes, and including a first electrode layer covering a first surface of the body to which the internal electrodes are exposed, and a second electrode layer covering the first electrode layer;
a first metal oxide layer disposed between the first and second electrode layers and having a discontinuous region; and
a second metal oxide layer covering at least a portion of a surface of the body on which the external electrodes are not disposed and having a multilayer structure, wherein the second metal oxide layer is not disposed on the first metal oxide layer, and the first metal oxide layer and the second metal oxide layer directly contact to each other at end portions of each of the first metal oxide layer and the second metal oxide layer.

* * * * *